United States Patent
Lee (10) Patent No.: US 12,139,114 B2
(45) Date of Patent: Nov. 12, 2024

(54) VEHICLE BRAKE SYSTEM

(71) Applicant: HL MANDO CORPORATION, Pyeongtaek-si (KR)

(72) Inventor: Gonjae Lee, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 586 days.

(21) Appl. No.: 17/232,303

(22) Filed: Apr. 16, 2021

(65) Prior Publication Data

US 2021/0323526 A1    Oct. 21, 2021

(30) Foreign Application Priority Data

Apr. 16, 2020  (KR) ........................ 10-2020-0045809

(51) Int. Cl.
| | | |
|---|---|---|
| *B60T 8/40* | (2006.01) | |
| *B60T 13/14* | (2006.01) | |
| *B60T 13/74* | (2006.01) | |
| *B60T 17/02* | (2006.01) | |
| *B60T 17/22* | (2006.01) | |

(52) U.S. Cl.
CPC ............ *B60T 13/745* (2013.01); *B60T 13/14* (2013.01); *B60T 17/02* (2013.01); *B60T 17/221* (2013.01)

(58) Field of Classification Search
CPC ...... B60T 8/368; B60T 8/4031; B60T 8/4036; B60T 13/14; B60T 13/662; B60T 13/686; B60T 13/745; B60T 7/042; B60T 17/02; B60T 17/221; B60T 2270/40; B60T 2270/406; G01M 3/045; G01M 3/16
See application file for complete search history.

(56) References Cited

U.S. PATENT DOCUMENTS

| | | | | |
|---|---|---|---|---|
| 4,631,952 A * | 12/1986 | Donaghey | ............... | G01N 27/12 338/34 |
| 4,726,233 A * | 2/1988 | Eckardt | ................... | G01L 19/00 73/49.3 |
| 6,241,489 B1 * | 6/2001 | Lewin | ..................... | B60T 8/368 439/744 |
| 6,375,473 B1 * | 4/2002 | Schliebe | ............ | H01R 13/6315 439/930 |
| 6,634,723 B1 * | 10/2003 | Ganzel | ..................... | B60T 8/368 303/DIG. 10 |
| 6,807,848 B1 * | 10/2004 | Fennel | ..................... | B60T 8/404 374/E7.018 |
| 2002/0101113 A1 * | 8/2002 | Tracht | ................... | B60T 15/028 303/113.1 |
| 2004/0075339 A1 * | 4/2004 | Volz | ........................ | G01P 3/443 303/116.4 |
| 2008/0017174 A1 * | 1/2008 | Kafer | ..................... | B60T 8/368 701/70 |

(Continued)

FOREIGN PATENT DOCUMENTS

KR    10-2006-0126663 A    12/2006

*Primary Examiner* — Nicholas J Lane
(74) *Attorney, Agent, or Firm* — Hauptman Ham, LLP (57) ABSTRACT

The present invention relates to a vehicle brake system. To this end, the vehicle brake system according to one aspect of the present invention includes an electric motor, a brake oil pump operated by the electric motor, and an electronic control unit including a motor connector to control the electric motor, and the electronic control unit includes a detecting sensor configured to detect oil introduced through the motor connector.

17 Claims, 10 Drawing Sheets

(56) References Cited

U.S. PATENT DOCUMENTS

| | | | |
|---|---|---|---|
| 2018/0065609 A1* | 3/2018 | Leiber | B60T 13/686 |
| 2018/0326959 A1* | 11/2018 | Micke | B60T 17/22 |
| 2019/0100182 A1* | 4/2019 | Leiber | B60T 8/368 |
| 2019/0237963 A1* | 8/2019 | Wuerstlein | G01M 3/16 |
| 2019/0242448 A1* | 8/2019 | Ross | B60T 13/746 |
| 2020/0132211 A1* | 4/2020 | Sugiura | F16K 31/0655 |
| 2020/0207316 A1* | 7/2020 | Inoue | B60T 13/146 |
| 2021/0108709 A1* | 4/2021 | Leiber | B60T 13/741 |

\* cited by examiner

FIG. 1

Prior Art

VEHICLE BRAKE SYSTEM

CROSS-REFERENCE TO RELATED APPLICATION

This application claims priority to and the benefit of Korean Patent Application No. 2020-0045809, filed on Apr. 16, 2020, the disclosure of which is incorporated herein by reference in its entirety.

BACKGROUND

1. Field of the Invention

The present invention relates to a vehicle brake system.

2. Discussion of Related Art

Generally, a brake system installed in a vehicle controls a brake hydraulic pressure to perform functions of an anti-lock brake system (ABS), electronic stability control (ESC), and electronic climate control (ECC) in order to secure traveling stability of the vehicle.

Such a brake system is coupled to a master cylinder, a modulator block configured to control a braking hydraulic pressure is provided on a hydraulic pressure line disposed between and connected to the master cylinder and a wheel cylinder of a wheel side, and the modulator block includes a plurality of solenoid valves, a low-pressure accumulator and a high-pressure accumulator which temporarily store oil discharged from the wheel cylinder, an oil pump configured to pump the oil temporarily stored in the low-pressure accumulator through an operation of a driving motor, and an electronic control unit (ECU) configured to control driving of the solenoid valve and an electric motor.

Recently, a fire problem is occurring due to electrization of such a brake system, and this is because the brake oil flows into an electric connection portion of the electric motor and the ECU, and thus an abnormal operation or short circuit occurs so that a fire occurs.

Accordingly, there is an urgent need for developing a technology of detecting a case in which the brake oil is introduced into the ECU and taking action therefore.

RELATED ART

[Patent Document]
(Patent Document 1) Korean Patent Laid-Open Publication No. 10-2006-0126663 (Published on Dec. 8, 2006)

SUMMARY OF THE INVENTION

The present invention is directed to providing a vehicle brake system capable of detecting a case in which oil is introduced into an electric control unit and taking action therefore.

Technical objectives to be solved by the present invention are not limited to the above-described technical objectives, and other objectives which are not described above will be clearly understood through the description below by those skilled in the art.

According to an aspect of the present invention, there is provided a vehicle brake system including an electric motor, a brake oil pump operated by the electric motor, and an electronic control unit including a motor connector to control the electric motor, wherein one side of the motor connector is electrically connected to the electric motor, the other side of the motor connector is electrically connected to a printed circuit board (PCB) disposed in the electronic control unit, and the electronic control unit includes a detecting sensor disposed between the motor connector and the PCB.

The motor connector may include a connector pin of which one side is exposed to an outside of the electronic control unit to be electrically connected to the electric motor and the other side is electrically connected to the PCB and a connector body which surrounds an outer portion of the connector pin.

The connector body may be disposed to be spaced apart from an upper surface of the PCB, and the other side of the connector pin may be formed to extend from a lower surface of the connector body and electrically connected to the PCB, and the detecting sensor may surround the other side of the connector pin and may be disposed between the lower surface of the connector body and the upper surface of the PCB.

The detecting sensor may include at least two electrode parts which are disposed to be spaced apart from each other and electrically connected by introduced oil.

A protruding member may be formed on one of the electrode parts to protrude toward another of the electrode parts, and an insertion groove, into which the protruding member is inserted, may be formed in the another of the electrode parts.

Alternatively, the detecting sensor may include an accommodation part for accommodating introduced oil.

A through-portion through which the connector pin passes may be formed in the detecting sensor, and a sealing member which surrounds a circumference of the connector pin may be provided in the through-portion.

The detecting sensor may include an absorption part which absorbs the introduced oil.

The electrode parts and the absorption part may be sequentially disposed in an oil introduction direction, and the introduced oil may sequentially pass through the electrode parts and the absorption part.

The detecting sensor may include at least two electrode parts which are formed to extend in parallel to each other, spaced apart from each other, and electrically connected by introduced oil.

The electrode parts may be disposed at both sides of the connector pin, and the at least two electrode parts may be disposed on each of one side and the other side of the connector pin.

Alternatively, the electrode parts may be disposed to be bent to surround the connector pin.

The electrode parts may be disposed in a radial shape to surround the connector pin.

According to another aspect of the present invention, there is provided a vehicle brake system including an electric motor, a brake oil pump operated by the electric motor, and an electronic control unit including a motor connector to control the electric motor, wherein the electronic control unit includes a detecting sensor having at least two layers to detect oil introduced through the motor connector, and the layers include at least two electrode layers which are disposed to be spaced apart from each other in an oil introduction direction and electrically connected by introduced oil and an absorption layer which absorbs the introduced oil.

The electrode layers and the absorption layer may be sequentially disposed in the oil introduction direction, and the introduced oil may sequentially pass through the electrode layers and the absorption layer.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention will be described in detail with reference to the accompanying drawings in order for those skilled in the art to easily perform the present invention. The present invention may be implemented in several different forms and is not limited to the embodiments described herein. Parts irrelevant to descriptions are omitted in the drawings in order to clearly explain the present invention, and the same or similar parts are denoted by the same reference numerals throughout this specification.

It should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof. In addition, when an element such as a layer, film, region, plate, or the like is referred to as being disposed "on" another portion, it includes not only the element being directly disposed on another element but also another element being disposed therebetween. Conversely, when an element such as a layer, film, region, plate, or the like is referred to as being "under" another portion, it includes not only the element being directly under another element but also another element being disposed therebetween.

Figure 1:
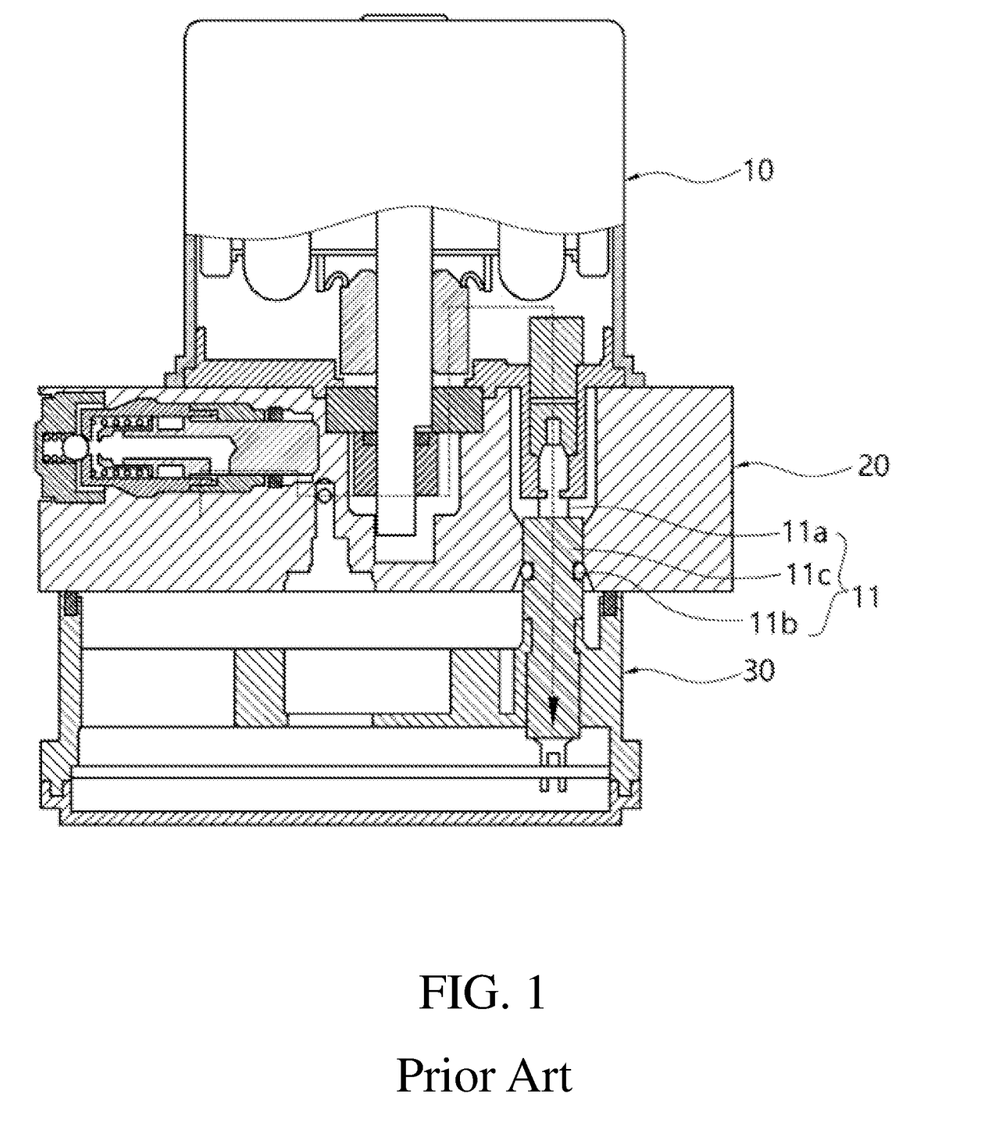
FIG. 1 is a cross-sectional view illustrating a conventional vehicle brake system.
Figure 2:
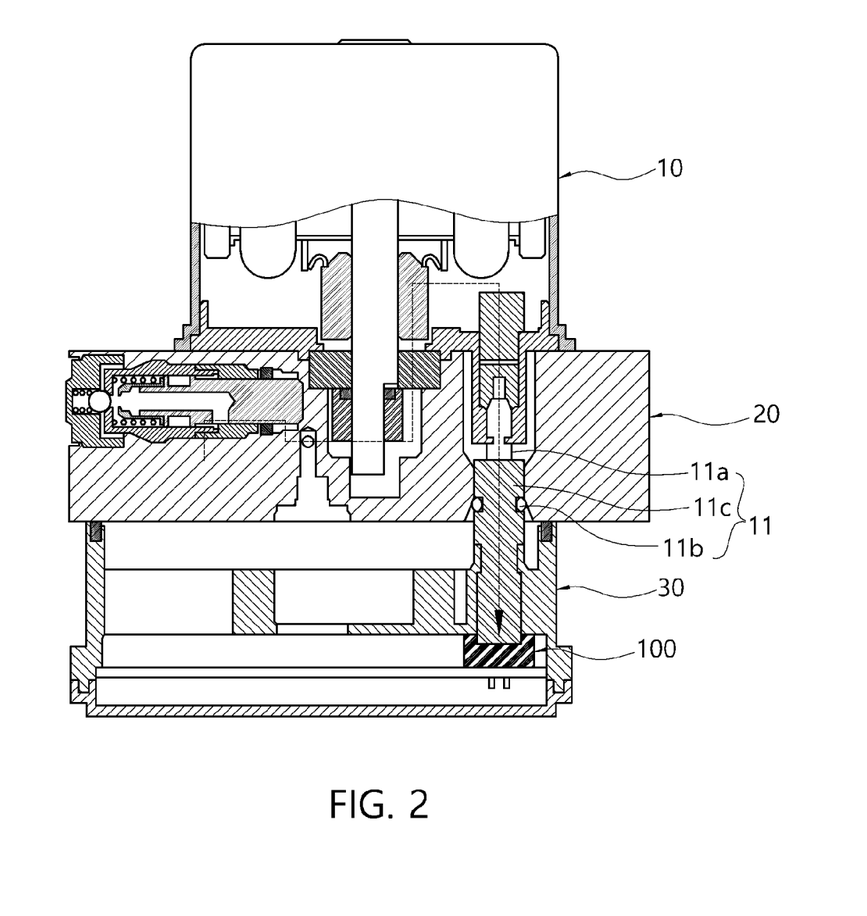
FIG. 2 is a cross-sectional view illustrating a vehicle brake system according to one embodiment of the present invention.

FIG. 1 is a cross-sectional view illustrating a conventional vehicle brake system, and FIG. 2 is a cross-sectional view illustrating a vehicle brake system according to one embodiment of the present invention.

As illustrated in FIG. 1, the conventional vehicle brake system includes an electric motor 10, a brake oil pump 20 which is operated by the electric motor 10, and an electronic control unit 30 including a motor connector 11 to control the electric motor 10.

However, as described above, in the case of the conventional vehicle brake system, a sealing rubber ring 11b for preventing oil flowing in the brake oil pump 20 from being introduced into the electronic control unit 30 through the electric motor 10 is provided on an outer surface of the motor connector 11. However, the sealing rubber ring 11b may block oil introduced along the outer surface of the motor connector 11 but may not block oil introduced through a fine gap having a size of several micrometers formed in the motor connector 11. That is, there is a problem in that oil is introduced first through connector pins 11a electrically connected to the electric motor, the oil moves into the electronic control unit 30 to cause occurrence of an abnormal operation or short circuit between components in the electronic control unit 30, and a fire occurs.

Accordingly, as illustrated in FIG. 2, a detecting sensor 100 configured to detect oil introduced through a motor connector 11 is provided in an electronic control unit 30 provided in a vehicle brake system according to one embodiment of the present invention vehicle.

The detecting sensor 100 may detect oil which is being introduced and notify a driver of the oil introduction, and the driver may check the oil introduction and take an action. Alternatively, a current supplied to the electronic control unit 30 may be blocked using a signal generated from the detecting sensor 100. Alternatively, the detecting sensor 100 may be configured to notify the driver primarily of the detection of the oil introduction so that the driver performs breaking normally, and in a case in which the oil introduction continues, the detecting sensor 100 may be configured to block a current supplied to the electronic control unit 30 secondarily. However, in the case in which the current supplied to the electronic control unit 30 is blocked secondarily, a function such as emergency braking may be performed at the same time.

Figure 3:
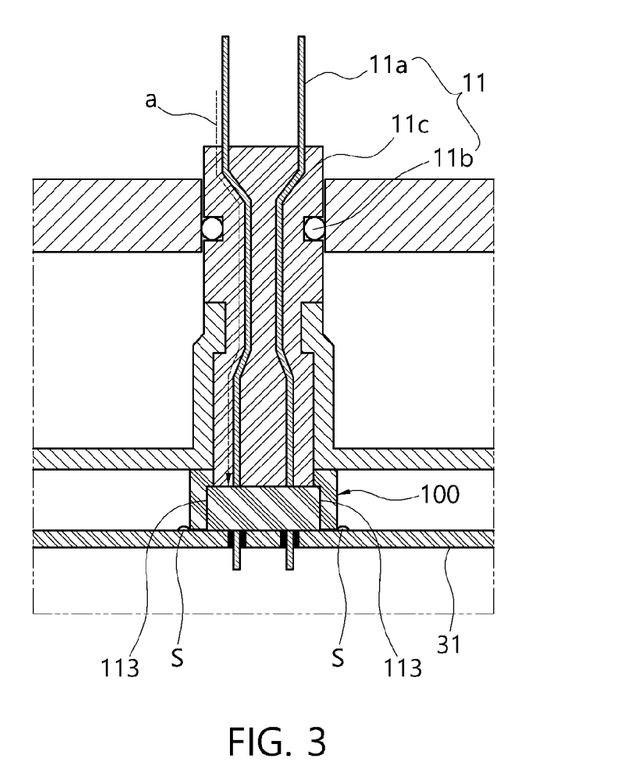
FIG. 3 is a cross-sectional view illustrating an electronic control unit according to one embodiment of the present invention.

FIG. 3 is a cross-sectional view illustrating the electronic control unit according to one embodiment of the present invention.

As illustrated in FIG. 3, one side of the motor connector 11 is electrically connected to an electric motor 10, the other side of the motor connector 11 is electrically connected to a printed circuit board (PCB) 31 disposed in the electronic control unit 30, and the detecting sensor 100 may be disposed between the motor connector 11 and the PCB 31. To this end, the motor connector 11 includes connector pins 11a of which one sides are exposed to the outside of the electronic control unit 30 to be electrically connected to the electric motor 10 and the other sides are electrically connected to the PCB 31 disposed in the electronic control unit 30 and a connector body 11c which surrounds outer portions of the connector pins 11a. In this case, the connector body 11c is disposed to be spaced apart from an upper surface of the PCB 31, the other side of the connector pin 11a is formed to extend from a lower surface of the connector body 11c and electrically connected to the PCB 31, and the detecting sensor 100 may surround the other side of the connector pin 11a and may be disposed between the lower surface of the connector body 11c and the upper surface of the PCB 31. Alternatively, the detecting sensor 100 may also be disposed at a connection position of the connector pin 11a and the electric motor 10 where the oil is first introduced.

The motor connector 11 is manufactured in a double injection method in a state in which the connector pin 11a is disposed to be inserted thereinto when the connector body 11c is injection molded. In addition, since a material of the connector body 11c is different from a material of the connector pin 11a, a fine gap having a size of several micrometers is unavoidably formed, oil is introduced through the gap due to a capillary effect, and the introduced oil moves (in an a direction) to the PCB 31 electrically connected to the connector pin 11a. However, as described above, when the detecting sensor 100 is provided between the connector pins 11a and the PCB 31, the oil introduced through such a passage can be effectively detected.

In addition, as illustrated in FIG. 1, since the detecting sensor 100 is disposed between the motor connector 11 and the PCB 31, the detecting sensor 100 may be applied without changing a structure of the existing brake system, and thus a cost burden can be minimized.

Figure 4:
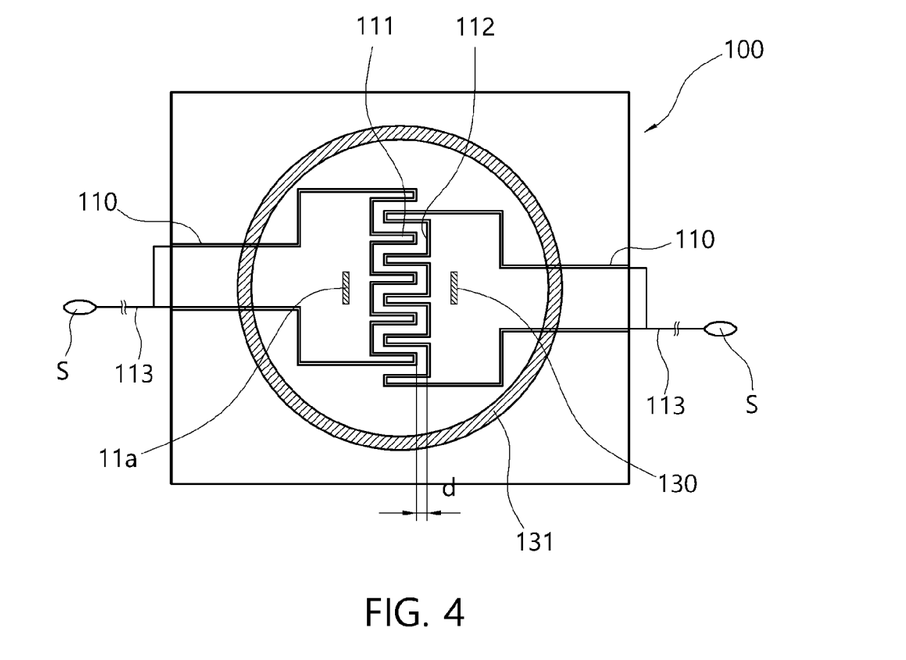
FIG. 4 is a plan view illustrating an electrode part of a detecting sensor according to one embodiment of the present invention.

FIG. 4 is a plan view illustrating an electrode part of the detecting sensor according to one embodiment of the present invention.

As illustrated in FIG. 4, the detecting sensor 100 may include at least two electrode parts 110 disposed to be spaced apart from each other and electrically connected to each other by introduced oil. That is, the electrode parts 110 are disposed on an upper surface of a body forming the detecting sensor 100, and since the electrode parts 110 are spaced apart from each other by a predetermined distance d normally, a current does not flow therebetween, but when the introduced oil flows between the electrode parts 110, the electrode parts 110 are electrically connected by the introduced oil so that a current flows therebetween. When the electrode parts 110 are electrically connected and the current flows as described above, an oil introduction signal is generated by the detecting sensors 100, and when the signal is input to the electronic control unit 30, the electronic control unit 30 may notify the driver of the oil introduction, block a current supplied to the electronic control unit 30, or sequentially perform the oil introduction notification and the current blocking. Through-portions 130 through which the connector pins 11a pass may be formed in the detecting sensor 100. In this case, as illustrated in FIG. 4, metal terminals 113 of which one ends are soldered (S) to the PCB 31 are connected to a pair of electrode parts 110 so that a current flows therebetween. That is, in a normal case in which oil is not introduced, the pair of electrode parts 110 are spaced apart from each other and a current does not flow therebetween, but when oil is introduced, the oil is impregnated and diffused in the body forming the detecting sensor 100, the pair of electrode parts 110 are electrically connected so that a current flows, and thus the oil introduction signal is generated using the current. Alternatively, the metal terminals 113 may be formed to be soldered (S) to a main control unit (MCU). The metal terminals 113 may be soldered (S) by a method of a surface mount device (SMD) type.

In addition, as illustrated in FIG. 4, separate sealing members 131, which restrict movement of the introduced oil, may be provided around portions through which the connector pins 11a pass such that the oil does not escape from the detecting sensor 100.

As illustrated in FIG. 4, protruding members 111 may be formed on one electrode part 110 to protrude toward another electrode part 110, and insertion grooves 112, into which protruding members 111 are inserted, may be formed in another electrode part 110.

That is, when the protruding members 111 and the corresponding insertion grooves 112 are formed on the electrode parts 110, and even any one of the protruding members 111 and a corresponding one of the insertion grooves 112 are electrically connected, the electrical connectivity is detectable. The electrode parts 110 may be formed on a PCB formed of a general synthetic resin material or may be formed on a PCB capable of absorbing the introduced oil. As an example, the pair of electrode parts 110 may be formed on the PCB capable of absorbing the oil in a printing method, and the electrode parts 110 may also be formed of not only a general metal material but also a material capable of absorbing the oil. When the PCB is formed of the above-described material, since the absorbed oil is diffused in the PCB and the electrode parts 110 are electrically connected even when a position at which the oil is introduced is spaced apart from a position at which the electrode parts 110 are formed by a predetermined distance, the electrical connectivity is detectable regardless of an introduction position of the oil.

To this end, the material of the PCB may be a porous material. For example, the synthetic porous material may be a foamed foam. The foamed foam may include any one among materials selected from the group consisting of acrylonitrile-butadiene rubber (NBR), butadiene rubber (BR), styrene butadiene rubber (SBR), natural rubber (NR), wet urethane, dry urethane, polyether, polyester, polyvinyl chloride, polyethylene, ethylene vinyl acetate (EVA), latex, silicone, styrene isoprene styrene (SIS), styrene ethylene butylene styrene (SEBS), polyvinyl alcohol (PVA), silicone elastomer, nitrile rubber, butyl rubber, and neoprene but is not limited thereto. The foamed foam may be foamed in a dry foaming method or wet foaming method, and the foamed foam may also contain fiber. In addition, loofah, konjac, sponge, cellulose, bio cellulose, or scoria may be used as a natural porous material.

Alternatively, the material of the PCB may be a synthetic or natural fiber material. The natural fiber material may be formed of at least one or formed to include at least one among cellulose, natural pulp, loofah, ramie fiber, ramie (plant), ayate (rough crust of agave or a palm tree), algae, bamboo, sisal, sisal terry (fabric woven with sisal), konjac, Tencel™ fiber fabric (Tencel fiber with natural antibacterial function made from eucalyptus wood), cotton felt, Tencel cotton, and abaca fiber but is not limited thereto.

The synthetic fiber may be formed of any one of nylon, acetate fiber, nylon non-woven fabric, cashmilon fiber (synthetic fiber that is acrylic fiber, which contains acrylonitrile $CH_2=CH-CN$ fiber as a main component), comfort fiber, polytrimethylene terephthalate fiber, polyethylene, polypropylene, polyacrylate, polyacetate, polylactic acid (PLA), and polylactic acid-based composite fibers but is not limited thereto.

In addition, the material of the PCB may be a porous material and have a WEB structure or a crimped structure.

Figure 5:
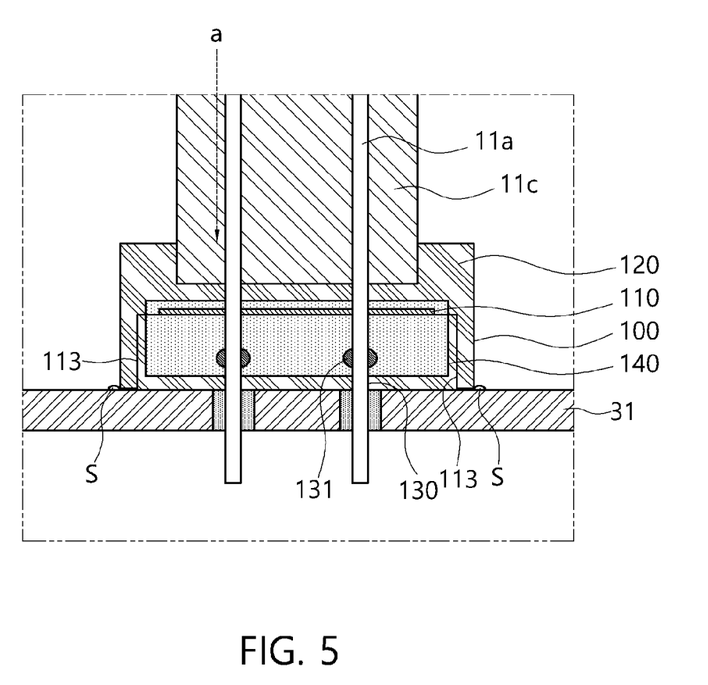
FIG. 5 is a cross-sectional view illustrating the detecting sensor according to one embodiment of the present invention.

FIG. 5 is a cross-sectional view illustrating the detecting sensor according to one embodiment of the present invention.

As illustrated in FIG. 5, an accommodation part 120 for accommodating introduced oil may be provided in the detecting sensor 100. The accommodation part 120 may be formed in a recessed shape in a direction in which the oil is introduced, and when the accommodation part 120 is provided, oil is prevented from overflowing the detecting sensor 100 even when a large amount of oil is introduced into the detecting sensor 100.

In addition, as illustrated in FIG. 5, the through-portion 130 through which the connector pin 11a passes may be formed in the detecting sensor 100, and the sealing member 131 which surrounds a circumference of the connector pin 11a may be provided in the through-portion 130.

That is, the connector pin 11a of the motor connector 11 electrically connects the electric motor 10 and the PCB 31, and to this end, the connector pin 11a passes through the detecting sensor 100. Although the through-portion 130, through which the connector pin 11a passes, is formed in the detecting sensor 100, since the introduced oil may move to the PCB 31 through the through-portion 130, the sealing member 131 which surrounds the connector pin 11a is provided to prevent the movement of the introduced oil as described above.

Although a general O-ring may be used as the sealing member 131, a material, which does not cause a fire while a current flows through the connector pin 11a, may be provided.

Alternatively, an absorption part 140 which absorbs the introduced oil may be provided in the detecting sensor 100. This is to prevent the introduced oil from moving to the PCB 31 after being detected by the electrode part 110.

A material of the absorption part 140 may be a porous material or a synthetic or natural fiber material, which is the same as that of the PCB, or may have a WEB or crimped structure.

As illustrated in FIG. 5, the absorption part 140 may be formed to surround the electrode part 110. That is, in a state in which the absorption part 140 surrounds the electrode part 110, when oil is introduced (in the a direction), the oil is absorbed by the absorption part 140 first, and the absorbed oil is diffused to the electrode part 110 to electrically connect the electrode parts 110 so that the oil may be detected. In this case, as illustrated in FIG. 5, the electrode part 110 is connected to the metal terminal 113 of which one end is soldered (S) to the PCB 31 so that a current flows to the PCB 31. The above-described metal terminal 113 may be formed to be soldered (S) to the MCU.

Figure 6:
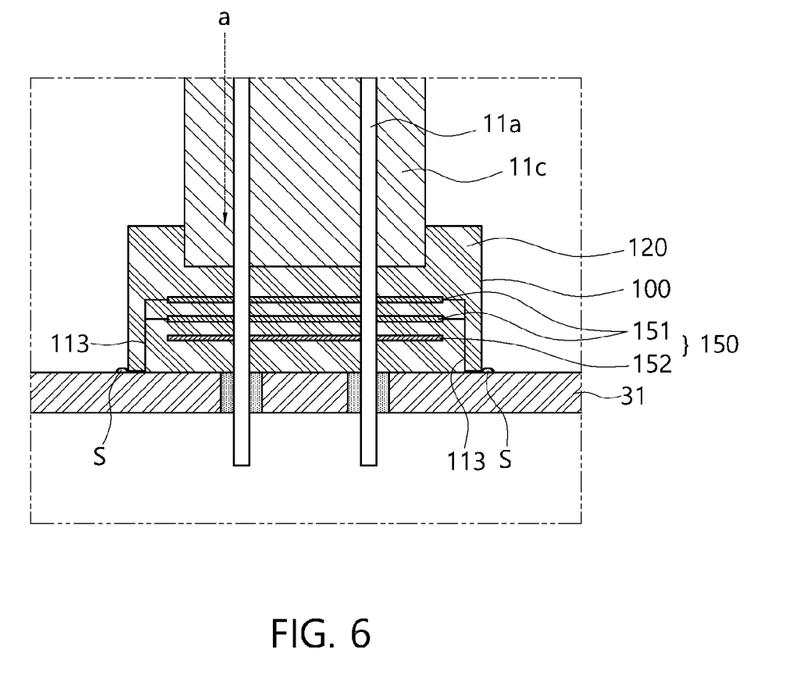
FIG. 6 is a cross-sectional view illustrating a detecting sensor according to another embodiment of the present invention.

FIG. 6 is a cross-sectional view illustrating a detecting sensor according to another embodiment of the present invention.

As illustrated in FIG. 6, electrode parts 110 and absorption part 140 may be formed to be disposed sequentially in an oil introduction direction (a direction) so that introduced oil may pass through the electrode parts 110 and the absorption part 140 sequentially.

That is, when oil is introduced and moved to the electrode parts 110, the electrode parts 110 are electrically connected, and a detecting sensor 100 notifies a driver of the oil introduction through the electrical connection. Then, when oil is introduced continuously, the oil moves toward the PCB 31 due to a capillary effect, and when the absorption part 140 is formed to absorb the oil, the oil introduction may be detected, and the movement of the introduced oil can also be effectively prevented.

Alternatively, at least two layers 150 may be provided in the detecting sensor 100 to detect oil introduced through a motor connector 11. As illustrated in FIG. 6, the layers 150 may be disposed to be spaced apart from each other in the oil introduction direction (a direction) and may include at least two electrode layers 151 which are electrically connected by the introduced oil and an absorption layer 152 which absorbs the introduced oil.

A state in which the above-described electrode parts 110 are spaced apart from each other in a horizontal direction is maintained, and a state in which the electrode layers 151 are spaced apart from each other in a vertical direction, that is, the oil introduction direction (a direction), is maintained. In the state in which the electrode layers 151 are disposed in the vertical direction, when oil is introduced, the upper electrode layer 151 may not detect the oil, but when an amount of introduced oil increases and the introduced oil moves to the lower electrode layer 151, the electrode layers 151 are electrically connected so that the oil introduction is detected. In this case, as illustrated in FIG. 6, metal terminals 113 of which one ends are soldered (S) to the PCB 31 are connected to the electrode layers 151 which are vertically disposed to allow a current to flow. The above-described metal terminals 113 may be formed to be soldered (S) to an MCU.

In this case, each of the electrode layers 151 may also be formed as a plurality of electrode parts 110 which are spaced apart from each other. That is, the upper electrode layer 151 is formed as the plurality of electrode parts 110 spaced apart from each other, and the lower electrode layer 151 is also formed as the plurality of electrode parts 110 spaced apart from each other. When the electrode layers 151 are formed as described above, and oil is introduced into the detecting sensor 100 to allow a current to flow through the upper electrode layer 151, the driver is primarily notified of the oil introduction to allow the driver to perform braking. Then, when oil is continuously introduced into the detecting sensor 100 and a current flows through the lower electrode layer 151, the driver is secondarily notified of the oil introduction, and a current supplied to an electronic control unit 30 is blocked.

In addition, the absorption layer 152 which absorbs introduced oil is provided, the electrode layers 151 and the absorption layer 152 are sequentially disposed in the oil introduction direction (a direction), and in this case, the oil, which is being introduced, sequentially passes through the electrode layers 151 and the absorption layer 152. When the detecting sensor 100 is formed as described above, the oil introduction may be detected, and movement of the introduced oil can be effectively prevented.

Figure 7:
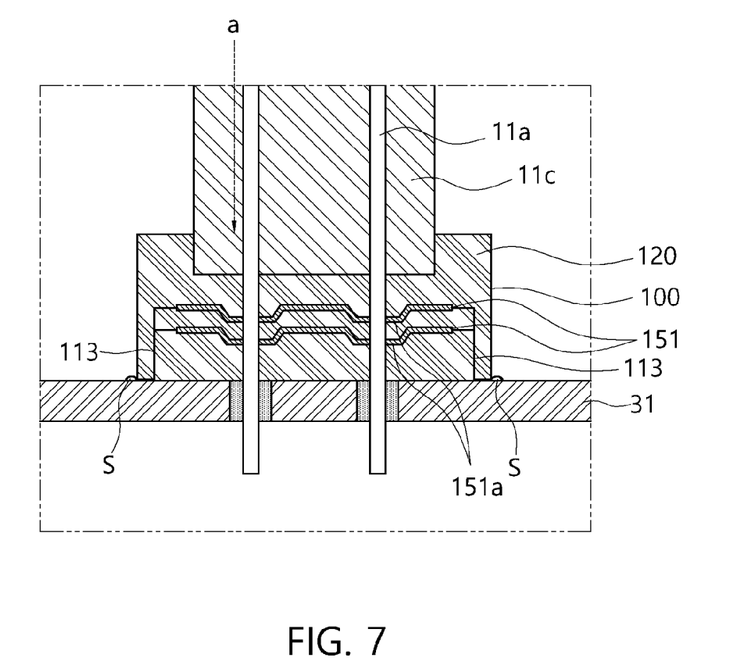
FIG. 7 is a cross-sectional view illustrating a detecting sensor according to still another embodiment of the present invention.

FIG. 7 is a cross-sectional view illustrating a detecting sensor according to still another embodiment of the present invention.

As illustrated in FIG. 7, metal terminals 113 of which one ends are soldered (S) to a PCB 31 are connected to electrode layers 151, which are vertically disposed, so that a current flows. The above-described metal terminals 113 may also be formed to be soldered (S) to an MCU. Accommodation grooves 151a in which introduced oil is accommodated may be formed in the electrode layers 151, and when the introduced oil is collected in the accommodation grooves 151a, surface tensions act between lumps of the oil, the lumps of the oil pull each other such that the oil does not move to the PCB 31, and thus the movement of the oil can be effectively prevented so that a separate configuration is not required to absorb the oil.

Figure 8:
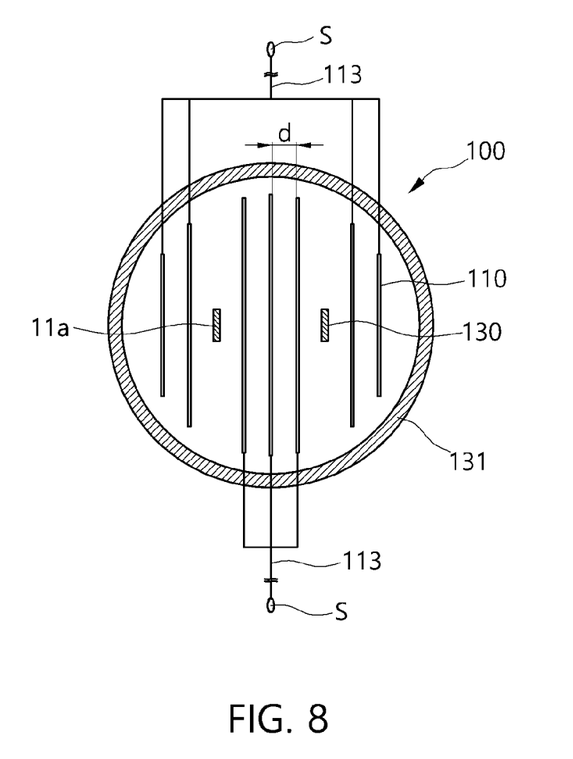
FIGS. 8 to 10 are cross-sectional views illustrating detecting sensors according to various embodiments of the present invention.
Figure 9:
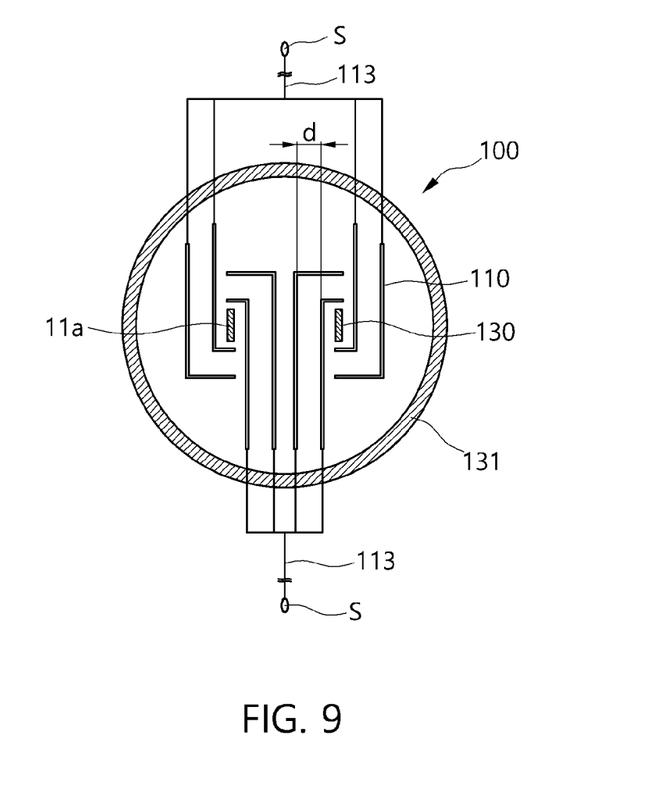
Figure 10:
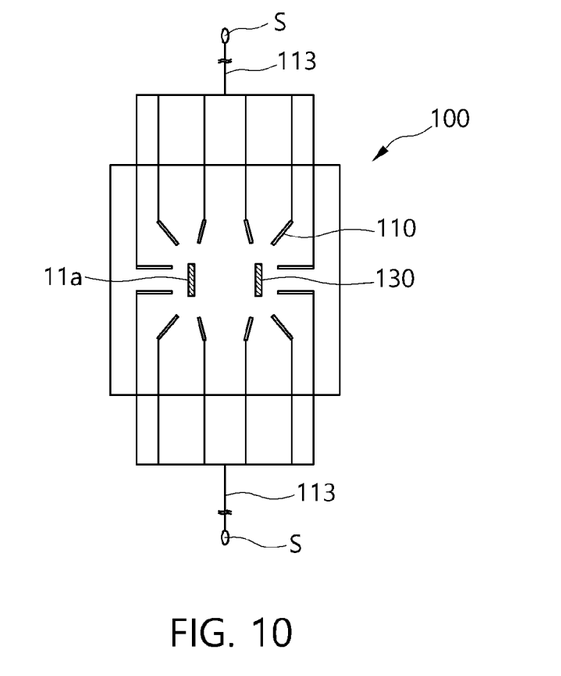

FIGS. 8 to 10 are cross-sectional views illustrating detecting sensors according to various embodiments of the present invention.

As illustrated in FIG. 8, a detecting sensor 100 may include at least two electrode parts 110 which are formed to extend in parallel to each other, spaced apart from each other, and electrically connected by introduced oil. In this case, the electrode parts 110 may be disposed at both sides of a connector pin 11a, and at least two electrode parts 110 may be disposed at each of one side and the other side of the connector pin 11a. Alternatively, as illustrated in FIG. 9, such electrode parts 110 may be disposed to be spaced apart from each other and to be bent to surround a connector pin 11a, and alternatively, as illustrated in FIG. 10, at least two electrode parts 110 may also be disposed in a radial shape to surround a connector pin 11a. As described above, since such electrode parts 110 are disposed on an upper surface of a body forming the detecting sensor 100 and are in a state in which the electrode parts 110 are spaced apart from each other by a predetermined distance d normally, a current does not flow therethrough, but, when introduced oil flows between the electrode parts 110, the electrode parts 110 spaced apart from each other are electrically connected by the introduced oil, and an oil introduction signal is generated by the detecting sensor 100. When the signal is input in an electronic control unit 30, the electronic control unit 30 may notify a driver of the oil introduction, block a current supplied to the electronic control unit 30, or also sequentially perform the oil introduction notification and the current blocking. A through-portion 130 through which the connector pin 11*a* passes may be formed in the detecting sensor 100. In this case, metal terminals 113 of which one ends are soldered (S) to a PCB 31 are connected to the electrode parts 110 so that a current flows. That is, when oil is not introduced into the detecting sensor 100 normally, the electrode parts 110 are spaced apart from each other such that a current does not flow, but when oil is introduced into the detecting sensor 100, the oil is impregnated and diffused in a body forming the detecting sensor 100 so that the electrode parts 110 are electrically connected, a current flows, and an oil introduction signal is generated using the current. Alternatively, the above-described metal terminals 113 may be formed to be soldered (S) to an MCU. In addition, the electrode parts 110 are disposed at both sides of the connector pin 11*a*, and when at least two electrode parts 110 are disposed at each of one side and the other side of the connector pin 11*a*, a position at which the electrode parts 110 are electrically connected can be detected, and an oil introduction position or an amount of introduced oil can be checked.

In a vehicle brake system of the present invention having the above-described configuration, since a detecting sensor configured to detect oil introduction is provided on a passage through which the brake oil is introduced into an electronic control unit, when the oil is introduced into the electric control unit, the detecting sensor can notify a driver of the oil introduction, and thus the driver can check the oil introduction and take an action.

In addition, since the detecting sensor is disposed between a motor connector and a printed circuit board (PCB) in the electronic control unit, the detecting sensor can be applied without changing a structure of a brake system, and thus a cost burden can be minimized.

In addition, the detecting sensor can detect the oil introduction and store the introduced oil at the same time in a manner of accommodating or absorbing the introduced oil such that the introduced oil does not move to the PCB.

Effects of the present invention are not limited to the above-described effects and should be understood to include all effects which may be inferred from the detailed description of the present invention or elements of the present invention described in the claims.

While the embodiments of the present invention have been described above, the spirit of the present invention is not limited to the embodiments proposed in this specification, and other embodiments may be easily suggested by adding, changing, and deleting components by those skilled in the art and will fall within the spiritual range of the present invention.

What is claimed is:

1. A vehicle brake system comprising:
   an electric motor;
   a brake oil pump operated by the electric motor; and
   an electronic control unit including a motor connector to control the electric motor,
   wherein one side of the motor connector is electrically connected to the electric motor,
   the other side of the motor connector is electrically connected to a printed circuit board (PCB) disposed in the electronic control unit, and
   the electronic control unit includes a detecting sensor disposed between the motor connector and the PCB, the detecting sensor detecting oil introduced through the motor connector.

2. The vehicle brake system of claim 1, wherein the motor connector includes:
   a connector pin of which one side is exposed to an outside of the electronic control unit to be electrically connected to the electric motor and the other side is electrically connected to the PCB; and
   a connector body which surrounds an outer portion of the connector pin.

3. The vehicle brake system of claim 2, wherein:
   the connector body is disposed to be spaced apart from an upper surface of the PCB;
   the other side of the connector pin is formed to extend from a lower surface of the connector body and electrically connected to the PCB; and
   the detecting sensor surrounds the other side of the connector pin and is disposed between the lower surface of the connector body and the upper surface of the PCB.

4. The vehicle brake system of claim 2, wherein the detecting sensor includes an accommodation part for accommodating the introduced oil.

5. The vehicle brake system of claim 2, wherein:
   a through-portion through which the connector pin passes is formed in the detecting sensor; and
   a sealing member which surrounds a circumference of the connector pin is provided in the through-portion.

6. The vehicle brake system of claim 2, wherein the detecting sensor includes at least two electrode parts which are formed to extend in parallel to each other, spaced apart from each other, and electrically connected by the introduced oil.

7. The vehicle brake system of claim 6, wherein:
   the electrode parts are disposed at both sides of the connector pin; and
   the at least two electrode parts are disposed on each of one side and the other side of the connector pin.

8. The vehicle brake system of claim 6, wherein the electrode parts are disposed to be bent to surround the connector pin.

9. The vehicle brake system of claim 6, wherein the electrode parts are disposed in a radial shape to surround the connector pin.

10. The vehicle brake system of claim 1, wherein the detecting sensor includes at least two electrode parts which are disposed to be spaced apart from each other and electrically connected by the introduced oil.

11. The vehicle brake system of claim 10, wherein:
    a protruding member is formed on one of the electrode parts to protrude toward another of the electrode parts; and
    an insertion groove, into which the protruding member is inserted, is formed in the another of the electrode parts.

12. The vehicle brake system of claim 10, wherein the detecting sensor includes an absorption part which absorbs the introduced oil.

13. The vehicle brake system of claim 12, wherein:
    the electrode parts and the absorption part are sequentially disposed in an oil introduction direction; and the introduced oil sequentially passes through the electrode parts and the absorption part.

14. The vehicle brake system of claim 1, wherein:
the detecting sensor has at least two layers to detect the introduced oil, and
the layers include at least two electrode layers which are disposed to be spaced apart from each other in an oil introduction direction and electrically connected by the introduced oil and an absorption layer which absorbs the introduced oil.

15. The vehicle brake system of claim 14, wherein:
the electrode layers and the absorption layer are sequentially disposed in the oil introduction direction; and
the introduced oil sequentially passes through the electrode layers and the absorption layer.

16. A vehicle brake system comprising:
an electric motor;
a brake oil pump operated by the electric motor; and
an electronic control unit including a motor connector to control the electric motor,
wherein one side of the motor connector is electrically connected to the electric motor,
the other side of the motor connector is electrically connected to a printed circuit board (PCB) disposed in the electronic control unit, and
the electronic control unit includes a detecting sensor disposed between the motor connector and the PCB,
wherein the detecting sensor includes at least two electrode parts which are disposed to be spaced apart from each other and electrically connected by introduced oil.

17. A vehicle brake system comprising:
an electric motor;
a brake oil pump operated by the electric motor; and
an electronic control unit including a motor connector to control the electric motor,
wherein one side of the motor connector is electrically connected to the electric motor,
the other side of the motor connector is electrically connected to a printed circuit board (PCB) disposed in the electronic control unit, and
the electronic control unit includes a detecting sensor disposed between the motor connector and the PCB,
wherein the motor connector includes:
a connector pin of which one side is exposed to an outside of the electronic control unit to be electrically connected to the electric motor and the other side is electrically connected to the PCB; and
a connector body which surrounds an outer portion of the connector pin,
wherein the detecting sensor includes at least two electrode parts which are formed to extend in parallel to each other, spaced apart from each other, and electrically connected by introduced oil.

* * * * *